INVENTOR.
TERESIO GASSINO
BY John Taggenburger
AGENT

INVENTOR.
TERESIO GASSINO

INVENTOR.
TERESIO GASSINO
BY John Tiggenburger
AGENT

United States Patent Office 3,451,616
Patented June 24, 1969

3,451,616
AUTOMATIC SHORTCUT MULTIPLICATION DEVICE FOR A CALCULATING MACHINE
Teresio Gassino, Ivrea, Turin, Italy, assignor to Ing. C. Olivetti & Co., S.p.A., Ivrea, Italy, an Italian corporation
Filed Apr. 1, 1966, Ser. No. 539,457
Claims priority, application Italy, Apr. 10, 1965, 8,940/65
Int. Cl. G06c 29/00
U.S. Cl. 235—60                                     14 Claims

ABSTRACT OF THE DISCLOSURE

A shortcut multiplication device for a calculating machine having a multiorder memory provided in each order with a differentially settable set up member and a cyclically operating shaft, comprises a cycle counting member adapted to sequentially engage each one of said set up members, and to be displaced by said shaft step by step along the engaged set up member in a predetermined direction in the case the multiplier figure requires the direct method of multiplication and in the opposite direction in the case the multiplier figure requires the short cut method. Each set up member is provided with an element having a predetermined length and adapted to be engaged by a counter element secured to said control member and having a length equal to the complement to nine with reference to the length of the element. The multiplication starts from left and the multiplier orders not requiring calculating cycles are skipped by the counting member.

---

This invention relates to an automatic shortcut multiplication device for a calculating machine comprising a settable memory adapted to store a multiorder multiplier and provided in each order with a set up member differentially settable according to the corresponding figure of the multiplier, and a cyclically operating mechanism.

There are known multiplication devices wherein each multiplier set up member is previously sensed by a cycle counting member. In a known multiplication device the cycle counting member in sensing the multiplier members effects a stroke corresponding to the number of the cycles to be made for each order of the multiplier, and it is then restored step by step. This device on one hand requires a relatively long time to presense said members, and on the other hand it is subject to misoperations caused by the negatively effected stroke of the cycle counting member.

These disadvantages are obviated by the automatic shortcut multiplication device according to the invention, which is characterized in that a control member for said mechanism is adapted to engage sequentially each one of said set up members, said mechanism being adapted to displace said control member step by step along the engaged set up member in a predetermined direction in the case said engaged set up member is set up according to a figure requiring the direct method of multiplication and in a direction opposite to said predetermined direction in the case said engaged set up member is set up according to a figure requiring the shortcut method.

This and other characteristics of the invention will become apparent from the following detailed description of a preferred embodiment thereof, and from the accompanying drawings, wherein.

General description

Figure 1:
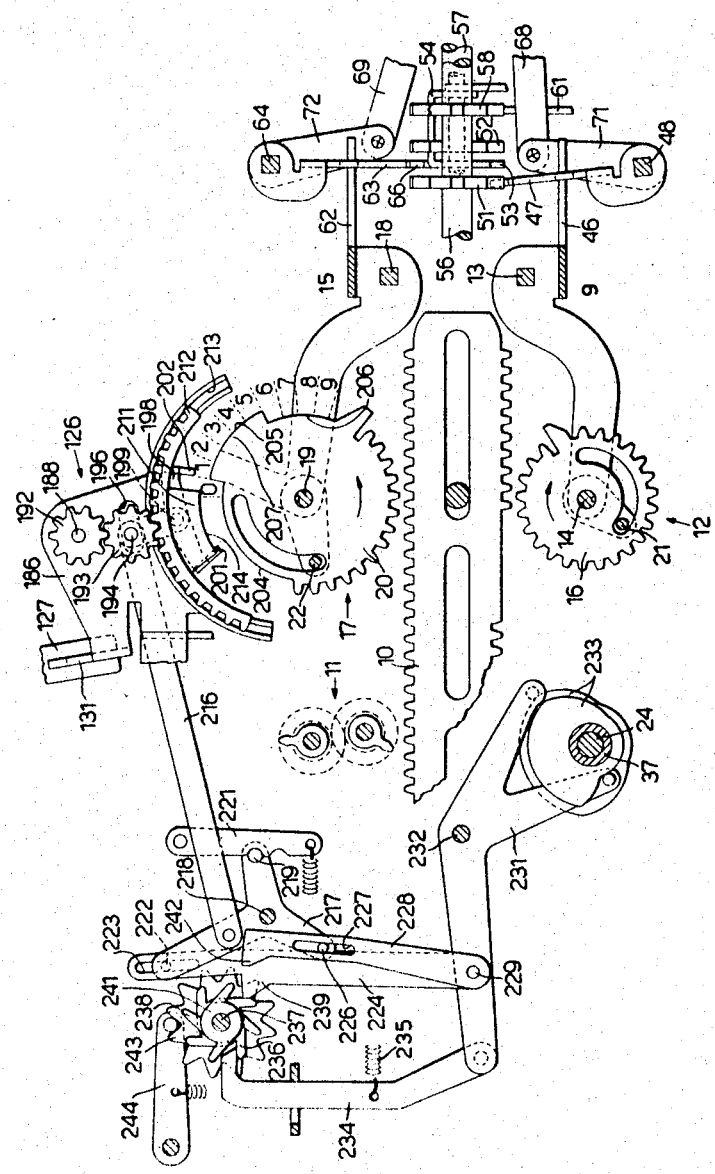
FIG. 1 is a left hand longitudinal partial sectional view of a calculating machine incorporating an automatic shortcut multiplication device according to the invention.

The multiplication device is incorporated in a ten key printing calculating machine provided with a set of actuators each one formed of a longitudinally reciprocable rack 10 (FIG. 1) adapted to cooperate with a totalizer 11 in a known manner. Furthermore, the calculating machine comprises a first memory or set up carriage 12 adapted to store a multiorder multiplicand and comprising a bail 9 transversely shiftable along a square shaft 13 rockably mounted on the machine frame and along a shaft 14 vertically movable on said frame. The carriage 12 is provided in each order with a toothed sector 16 rotatably and shiftably mounted on the shaft 14 and differentially settable clockwise from the zero position shown in FIG. 1, through the ten key keyboard of the machine.

The calculating machine comprises also a second memory or set up carriage 17 adapted to store a multiorder multiplier and substantially symmetrical to the carriage 12 with respect to the actuators 10. The carriage 17 comprises a bail 15 transversely shiftable along a second square shaft 18 rockably mounted on the machine frame and along a shaft 19 vertically movable on said frame. The carriage 17 is provided in each order with a set up member formed of a toothed sector 20 rotatably and shiftably mounted on the shaft 19 and differentially settable counterclockwise from the zero position shown in FIG. 1, through the same ten key keyboard.

The sectors 16 and 20 are normally rotated according to the last amounts set up therein until a new amount will be set up. Upon the setting up in the carriage 12 the first order of a new amount, a first universal bar 21 is rocked counterclockwise to zeroize all the sectors 16, whereas a second universal bar 22 is rocked clockwise to zeroize all the sectors 20 when the first order of a new amount is set up on the carriage 17, substantially in the manner described in the United States patent application Ser. No. 398,915 dated Sept. 24, 1964, now patent No. 3,319,882.

The calculating machine is provided with a power driving device comprising three cyclically power operating mechanisms substantially as described in the United States patent application Ser. No. 506,958 dated Nov. 9, 1965, now patent No. 3,331,556. Particularly, each one of said mechanisms comprise a corresponding shaft 23, 24, and 25. Upon depressing each function motor key, a latch 26 (FIG. 4) is displaced rearwards thus releasing a lug 27 of a lever 28 fulcrumed on a pivot 29, and a pin 30 of a lever 31 fulcrumed on a pivot 32. Then the lever 28 is rocked counterclockwise and through a pin 28' rocks a lever 33 clockwise about a pivot 179, thus engaging a corresponding clutch for rotating the shaft 23 through a one-revolution cycle, said shaft being hereinafter called servomotor shaft. During the cycle of the shaft 23, some machine functions, for example the totalizer selection, the totalizer reversing and the carriage 12, 17 selection are automatically predisposed. Furthermore a cam 34 rocks a lever 35, which in turn rocks the lever 28 clockwise, the lever 28 being then latched in the rocked position by a lug 36 of the lever 31 till the pawl 26 will be restored forwards.

Upon depressing each numeral key of the ten key keyboard the shaft 24, hereinafter called auxiliary shaft, is rotated for a one-revolution cycle to control the setting up of the corresponding figure. Rotatably mounted on the shaft 24 is a sleeve 37 provided with a set of cams adapted to control a set of machine functions, but normally locked in an ineffective position. Upon depressing a function motor key the sleeve 37 is angularly secured to the auxiliary shaft 24, whereby the servomotor shaft 23, near the end of its cycle, causes both the shaft 24 and the sleeve 37 to begin an auxiliary cycle to effect some machine functions for example the engagement of the sectors 16 or 20 (FIG. 1) with the racks 10. Thereafter, a cam of the sleeve 37 (not shown in the drawings) causes a lever 38 (FIG. 5) fulcrumed on the pivot 29 to be yieldably rocked clockwise. The lever 38 on one hand through a lug 39 arrests the shaft 24 and the sleeve 37 upon being rotated 270 degrees thus terminating a first part of the auxiliary cycle, on the other hand it causes the shaft 25 (FIG. 4) to begin a one-revolution cycle. The shaft 25 controls a conventional not shown universal bar of the racks 10 (FIG. 1) and therefore it will be called hereinafter the main shaft of the machine.

At the beginning of the cycle of the main shaft 25 the totalizer 11 engages the actuators 10. Thereafter the universal bar 21 is rocked counterclockwise, or the universal bar 22 is rocked clockwise to return the sectors 16 or 20 respectively to their zero position, synchronously with the universal bar of the racks 10. The racks 10 are thus positively displaced rearwards, whereby the amount set upon the carriage 12, 17 engaged therewith is accumulated into the totalizer 11. Furthermore, a printing mechanism is operated in a known manner for printing the accumulated amount on the paper.

Thereafter, the totalizer 11 disengages the racks 10, which are now positively restored, while the sectors 16 and 20 are returned to the angular position occupied at the beginning of the cycle, whereby at the end of each cycle of the main shaft 25 the printed amounts remain set up into the sectors 16 or 20.

Near the end of the cycle of the shaft 25, the lever 38 (FIG. 5) is restored counterclockwise, whereby the auxiliary shaft 24 and the sleeve 37 effect a second part of the auxiliary cycle while the shaft 25 is arrested. During this second part of the auxiliary cycle the sectors 16 or 20, are disengaged from the racks 10 and the carriage 12 or 17 respectively, is restored rightwards. At the end of the second part of the auxiliary cycle the latch 26 (FIG. 4) is returned forwards and rocks the lever 31 counterclockwise, thus releasing the lever 28. The whole of one cycle of the shaft 23, one cycle of the shaft 24 and of the sleeve 37, and one cycle of the shaft 25 represents one machine cycle.

Furthermore, the calculating machine is provided with a program control device comprising a shaft 42 (FIG. 4) adapted to be sequentially located in each one of a predetermined group of twenty angular stations. In each one of these stations the shaft 42 is adapted to control various machine functions in a known manner. The shaft 42 is selectively rotated under the control of a cam of the sleeve 37, not shown in the drawings, during the first part of the auxiliary cycle, when a lever 43 (FIG. 5) is rocked clockwise by a spring 44, under the control of a depressed function control key as described in copending patent application Ser. No. 533,974 dated Mar. 14, 1966, now Patent No. 3,370,788, entitled: "Program control device for a calculating or like machine."

The bail 9 of the carriage 12 (FIG. 1) is urged rightwards by a spring 59 (FIG. 2) and is provided with a projection 46 entering a notch of a rack 47 transversely slidable on a square shaft 48 (FIG. 1) rockably mounted on the machine frame. The rack 47 normally meshes with a pinion 51 secured to a longitudinal shaft 56 (FIG. 2) adapted to be rotated for displacing the rack 47 step by step when meshing the pinion 51 leftwards upon setting up each order of an amount. Furthermore the rack 47 is adapted to mesh with a pinion 52 (FIG. 1) secured to a longitudinal shaft 57 rotated synchronously with the shaft 56 by means of a pair of intermeshing pinions 58, whereby the rack 47 when meshing with the pinion 52 may be displaced step by step rightwards. Finally, the rack 47 may be locked in the transverse reached position by engaging an arm 53 of a bail 54.

Similarly, the bail 15 of the carriage 17 is normally urged rightwards by a spring 67 (FIG. 2) and is provided with a projection 62 entering a notch of a second rack 63 transversely slidable on a square shaft 64 rockably mounted on the machine frame. The rack 63 is adapted to mesh with the pinion 52 (FIG. 1) to be displaced step by step leftwards or with the pinion 51 to be displaced step by step rightwards. The carriage 17 is normally transversely locked by another arm 66 of the bail 54.

The pinions 58 are locked by a latch 61 against the urge of the springs 59 and 67 respectively. The two square shafts 48 and 64 may be rocked together with the racks 47 and 63 under the control of two cams of the shaft 42 through two corresponding links 68 and 69 linked with two arms 71 and 72 secured to the shafts 48, respectively 64.

Associated with the carriages 12 and 17 are two sectors 76 (FIG. 5) and 77 respectively, bodily rotatable with a corresponding shaft 78 and 79 respectively, but axially slidable with respect thereto. Each sector 76, 77 is adapted to cooperate with a corresponding toothed edge of a slide 81 engaging a pinion 82 adapted to be rotated synchronously with the shaft 56 for transversely displacing the slide 81 along the shafts 78 and 79. The sectors 76 and 77 are selected by a cam of the program shaft 42 and are operated for controlling the step by step movement of the associated carriage 12, 17. Their position on the slide 81 represents the record of the number of orders of the amount stored in the associated carriage.

Figure 2:
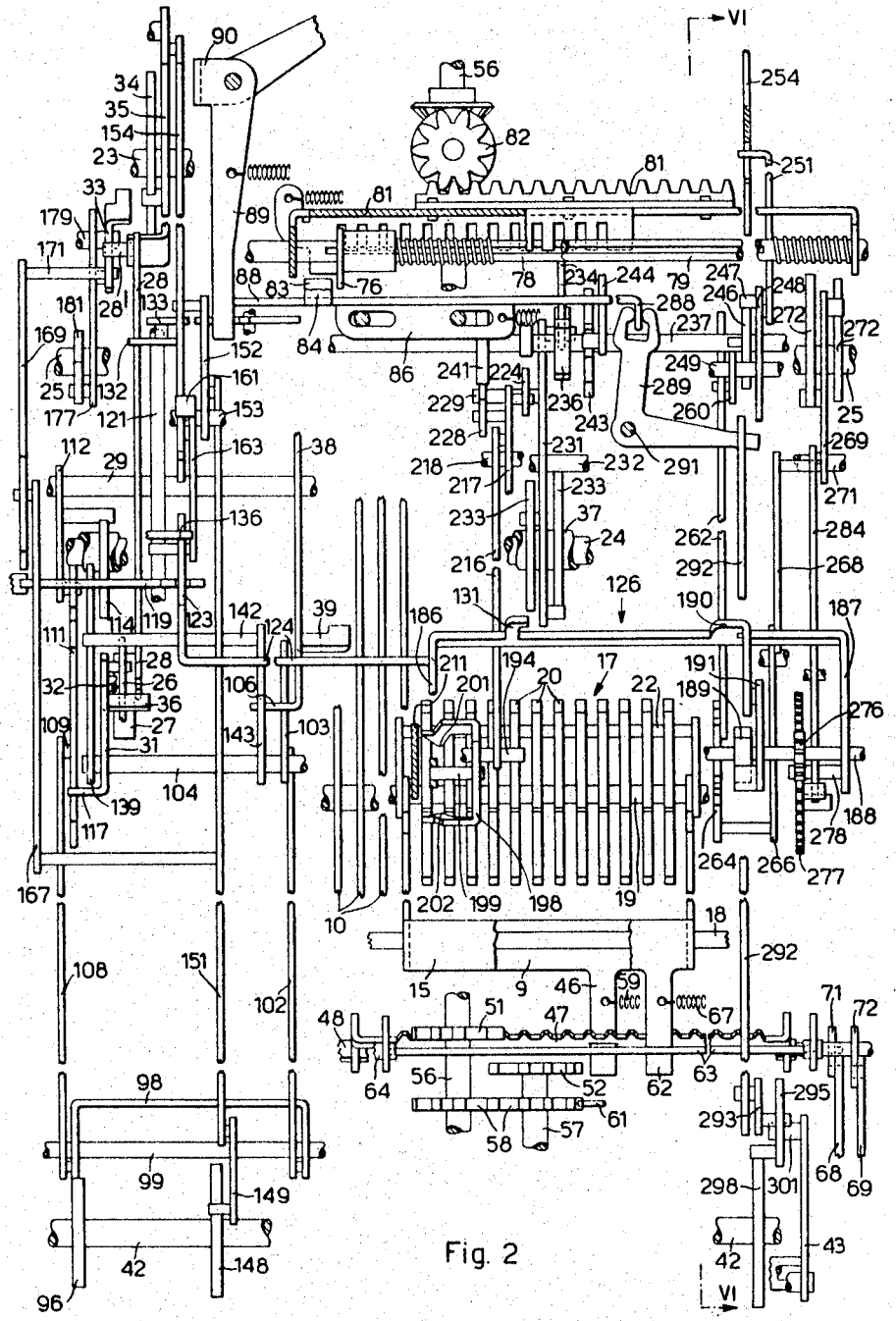
FIG. 2 is a partial plan view of the machine.

The auxiliary shaft 24 is provided with a cam not shown in the drawings for engaging a clutch to rotate the shaft 56 (FIG. 1). The same clutch may be engaged by a cam of the servomotor shaft 23 for tabulating the carriage 12 or 17 according to the number of orders set up therein or, in a total taking operation, according to the number of orders of the total accumulated in the totalizer 11, in a known manner. The selected sector 76, 77 (FIG. 5) when it encounters a lug 83, and 84 respectively, causes a projection 88 of a slide 86 to engage an arm 89 of a bail 90 (FIG. 2). This latter is thus rocked clockwise to cause the clutch of the shaft 56 to be disengaged.

The carriages 12 and 17 are restored rightwards by disengaging the latch 61 from the gear 58, or the bail 54 from the racks 47 and 63 under the control of the program shaft 42 during the second part of the auxiliary cycle. Normally when the program shaft 42 is at rest, only the latch 61 is disengaged.

*Multiplicand set up and printing*

The multiplicand is set up on the carriage 12 by the ten key keyboard like any other amount. Upon depressing a multiplication key not shown in the drawings, a machine cycle is started and during the cycle of the auxiliary shaft 24 the program shaft 42 causes the rack 47 (FIG. 1) to engage the arm 53 of the bail 54. Furthermore, the depressed key causes the program shaft 42 to begin a program sequence for effecting the multiplication, whereby the program shaft 42 will be sequentially arrested in the stations VI, VII, XII and XIV.

During the cycle of the main shaft 25 the set up multiplicand is printed. Thereafter, during the second part of the auxiliary cycle of the shaft 24, the latch 61 is disengaged from the pinions 58, but the carriage 12 and the slide 81 (FIG. 5) are not restored rightwards because the carriage 12 engages the arm 53 (FIG. 1) of the bail 54. At the end of the second part of the auxiliary cycle the machine is stopped, the program shaft being now located in the station VI.

The multiplicand may be already set up on the carriage 12 as a result of preceding operations. In this case the multiplication key is depressed without previously setting up the multiplicand and the carriage 12 is tabulated leftwards during the cycle of the servomotor shaft 23. Similarly if a multiplicand is the sum of various amounts, after the last amount has been added the total and the multiplication keys are simultaneously depressed. Now the total is automatically transferred back into the carriage 12, while the program shaft 42 is displaced to the station VI for processing this total as a multiplicand.

*Multiplier set up*

After the multiplicand has been printed, the multiplier is set up order by order through the same keyboard. Upon setting up the first order of the multiplier, the auxiliary shaft 24 under the control of the program shaft 42 in the station VI, meshes now the rack 47 (FIG. 1) with the pinion 51, the rack 63 with the pinion 52, and predisposes the carriage 17 for receiving the new set up amount, whereby the multiplier is set up in the carriage 17, which is shifted leftwards step by step together with the multiplicand carriage 12. Therefore, upon having set up the multiplier the carriage 12 is displaced leftwards according to the sum of the number of orders of the multiplicand and of the multiplier. The carriage 12 is thus transversely aligned with the highest order of the product and is ready for beginning the multiplication from the highest order to the lower orders of the multiplier.

Of course the multiplier may be already set up on the carriage 17 as a result of the preceding operations. In this case the multiplication key may be depressed after the multiplicand is printed.

*Muliplication starting device*

Figure 4:
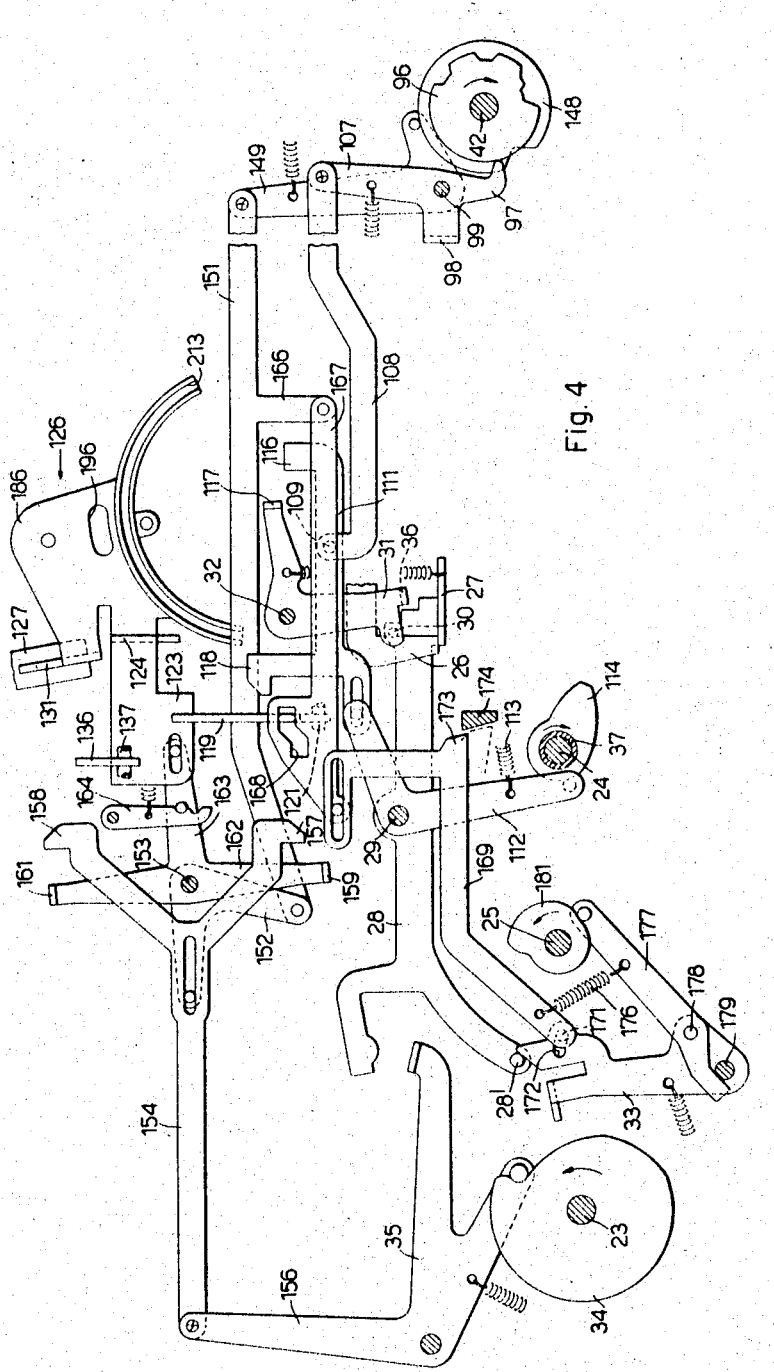
FIG. 4 is a further left hand partial sectional view of the machine.

With reference to the FIG. 4, secured on the program shaft 42 is a cam 96 adapted to cooperate with an arm 97 of a bail 98 fulcrumed on a stationary shaft 99. Another arm 101 of the bail 98 (FIG. 5) is connected through a link 102 to a latch 103 fulcrumed on a stationary shaft 104 and adapted to engage a lug 106 of the lever 38 to exclude the cycle of the main shaft 25 from the machine cycle as described in the cited application No. 506,958. The bail 98 is provided with a third arm 107 (FIG. 4) linked with a link 108 carrying a pivot 109 pivotally mounting a swing lever 111 pin and slot connected with a lever 112. In turn the lever 112 is fulcrumed on the pivot 29 and is normally urged by a spring 113 to contact a cam 114 secured to the sleeve 37.

Furthermore the lever 111 is provided with a projection 116 adapted to cooperate with a lug 117 of the lever 31. A projection 118 of the lever 111 is adapted to engage a lever 119 (FIG. 3) secured to a longitudinal shaft 121 rotatably mounted on the machine frame. The lever 119 is provided with a forked end 122 engaging a bent lug 123 of a projection 124 integral with a support 126 carrying the various control members in the multiplication. The support 126 is slidable in a notch provided on a pair of projections 127 and 128 of the machine frame and urged upwards by a spring 129. Another projection 131 of the support 126 is transversely urged by the same spring 129 to contact projection 127.

Figure 3:
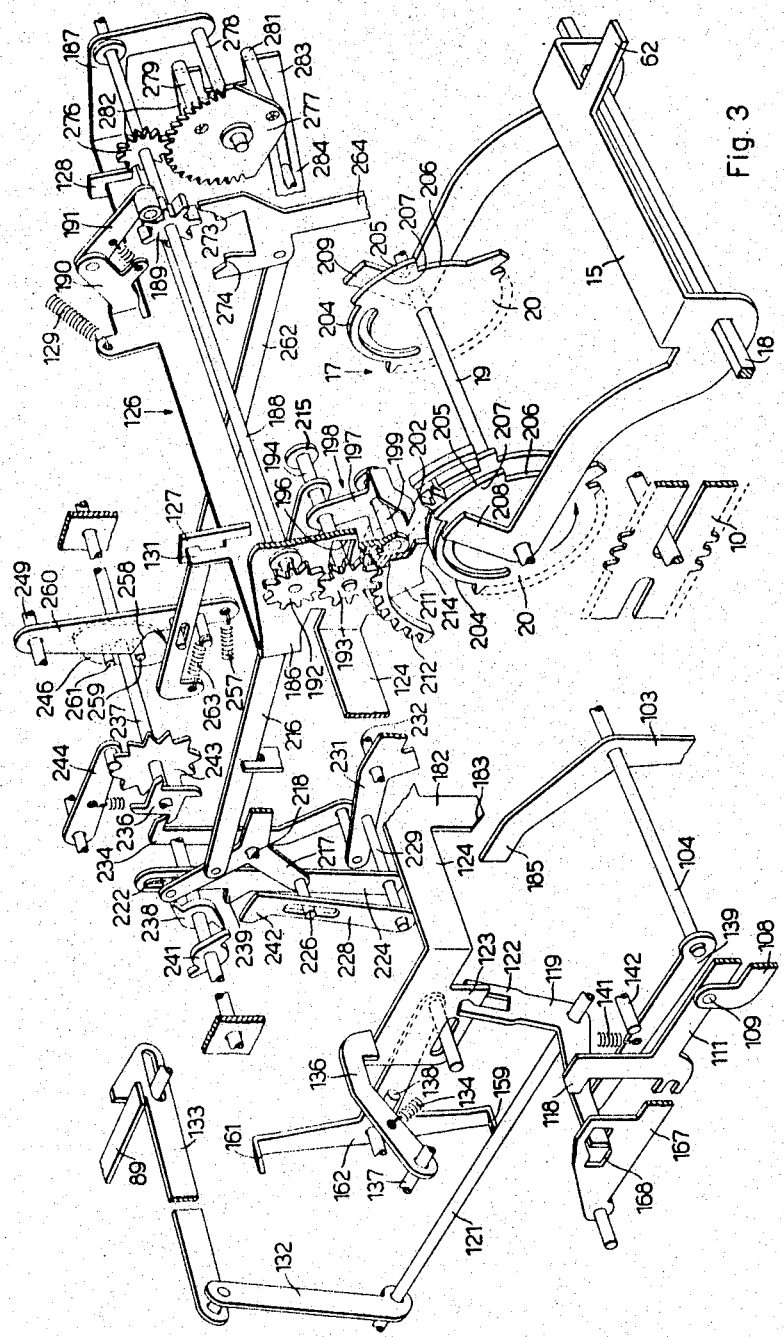
FIG. 3 is a partial perspective view of the machine.

Secured to the shaft 121 is another lever 132 linked with a slide 133 adapted to engage the arm 89 (FIG. 2) of the bail 90, when the clutch of the shaft 56 has been engaged and the bail 90 has been rocked counterclockwise. A latch 136 (FIG. 3) fulcrumed on a stationary pivot 137 is normally urged by a spring 134 to contact the upper edge of the lug 123 (FIG. 3). The latch 136 may be rocked clockwise till encountering a stationary stop 138. A lever 139 fulcrumed on the shaft 104 is normally urged by a spring 141 to contact the lever 119, whereas a lever 143 (FIG. 5) also fulcrumed on the shaft 104, is provided with a pin 142 normally urged by a spring 144 to contact the lever 139. The lever 143 is also provided with a projection 146 adapted to cooperate with the lug 106 of the lever 38.

As described hereinabove, during the multiplicand printing cycle the program shaft 42 is displaced to the station VI, whereby the cam 96 (FIG. 4) caused the bail 98 to rock counterclockwise. The arm 107 of the bail 98 through the link 108 then displaced the lever 111 rearwards and brought the projection 118 above the lever 119 and the projection 116 under the lug 117 of the lever 31. Simultaneously, the bail 98 (FIG. 5) through the link 102 brought the latch 103 under the lug 106 of the lever 38.

Upon depressing a multiplication motor key the servomotor shaft 23 begins its cycle. If the multiplier was already stored in the carriage 17 (FIG. 1) as a result of previous operation no set up cycle has been effected by the shaft 24 after the multiplicand has been printed. In this case the shaft 23 causes the clutch of the shaft 56 to be engaged, whereby the carriage 17 is tabulated leftwards together with the carriage 12 and the rack 81 (FIG. 5) under the control of the sector 77 recording the number of orders of the multiplier.

At the beginning of the subsequent auxiliary cycle the rack 47 (FIG. 1) under the control of the program shaft 42 engages the arm 53 of the bail 54. In turn the cam 114 (FIG. 4) of the sleeve 37 rocks the lever 112 clockwise. Then the lever 111 is rocked counterclockwise, whereby the projection 118 (FIG. 3) rocks the lever 119 counterclockwise. The forked end 122 of the lever 119 displaces now the support 126 one step leftwards, thus causing the latch 136 to be rocked clockwise and to latch the lug 123 of the support 126 in the displaced position. In turn the crank-lever 132 displaces the slide 133 leftwards, but because the clutch of the shaft 56 is already disengaged the slide 133 does not affect the bail 90 (FIG. 2). The lever 139 (FIG. 5) is rocked counterclockwise by the lever 119, whereas the lug 106 of the lever 38 temporarily prevents the lever 143 from being rocked by the spring 144. Since the latch 103 is predisposed into the path of the lug 106, the lever 38 is prevented from being rocked clockwise and therefore at the end of the first part of the auxiliary cycle the shaft 24 is not arrested, and the main shaft 25 is not started. Furthermore, the lever 111 (FIG. 4) through its projection 116 engages the lug 117, thus rocking the lever 31 counterclockwise and disengaging the lug 36 from the lever 28. This latter is thus released again counterclockwise and at the end of the auxiliary cycle a new machine cycle will be started. The program shaft 42 is now displaced to the station VII while the latch 61 (FIG. 1) is disengaged from the pinions 58, whereby the carriage 17 is restored rightwards by the spring 67 (FIG. 2), while the carriage 12 remains locked in the displaced position, since the rack 47 (FIG. 1) engages the arm 53 of the bail 54.

Secured to the program shaft 42 is a cam 148 (FIG. 4) normally contacted by a lever 149 fulcrumed on the shaft 99. The lever 149 is connected through a link 151 to a lever 152 fulcrumed on a stationary shaft 153, and is pin and slot connected to a link 154 linked with an arm 156 of the lever 35 and provided with a pair of shoulders 157 and 158 adapted to cooperate with two corresponding lugs 159 and 161 of a lever 162 fulcrumed on the shaft 53. The lever 162 is also provided with an arm 163 pin and slot connected to the lug 123 of the support 126. The lever 162 is adapted to be locked in each one of two angular positions by a spring urged locking member 164.

The link 151 is also provided with a projection 166 linked with a slide 167, which is provided with a cam slot 168 engaging an end of the lever 119 (FIG. 3). Furthermore, the slide 167 (FIG. 4) is pin and slot connected with a link 169 provided with a pin 171 engaging a slot 172 of the lever 33. A shoulder 173 of the link 169 is normally located behind a stationary stop 174. The link 169 is yieldably connected by a spring 176 to a lever 177 fulcrumed on a pivot 178 secured to the lever 33. The spring 176 also urges the lever 177 to normally contact the pivot 179 and a cam 181 of the main shaft 25.

The projection 124 of the support 126 (FIG. 3) is also provided with a lug 182 having a tapered edge 183 adapted to cooperate with an arm 185 of the latch 103. In turn the support 126 is provided with two flanks 186 and 187 rotatably mounting a shaft 188. Secured to the shaft 188 is a toothed member or wheel 189 normally locked by a spring urged locking member 191 pivoted on a projection 190 of said support 126.

Each sector 20 (FIG. 1) of the multiplier carriage 17 is provided with an element or projection 207 having a circular edge 205 with a diameter longer than that of two adjacent edges 204 and 206 of the sector 20. The edge 205 of the projection 207 has a predetermined length corresponding to five steps of the sector 20. The projection 207 is adapted to be transversely engaged by a control member formed of a plate 211 integral with a toothed sector 212 slidably mounted on an arcuate guide 213 (FIG. 1) provided on the flank 186. Integral with the sector 212 is the counterelement or plate 211 (FIG. 3) adapted to laterally contact each projection 207. The plate 211 is provided with a lower arcuate edge 214 (FIG. 1) having a length equal to the complement to nine steps with respect to the length of the projection 207, namely a length of four steps. The sector 212 constantly meshes with a pinion 193 in turn meshing with a similar pinion 192 secured to the left hand end of the shaft 188 (FIG. 3).

The pinion 193, is axially bodily movable but rotatably mounted on a rod 194 crossing an aperture 196 of the flank 186. The rod 194 is secured to an arm 197 of a sensing member formed of a swing lever 198 fulcrumed on a pivot 199 secured to the same flank 186 of the support 126. Furthermore, the lever 198 is provided with two fingers 201 and 202 each one having a V-shaped lower edge and adapted (FIG. 1) to sense the upper edge 205 of the projection 207 of each sector 20. The two fingers 201 and 202 are mutually distanced as the length of the projection 207, namely five steps of the sectors 20, and are adapted to sense the sector 20 of the next lower order with respect to the sector 20 engaged by the plate 211.

The two side arms of the bail 15 (FIG. 3) are provided with two projections 208 and 209 respectively, having an arcuate upper edge having the same diameter as the edge 205. The projection 208 is located one step at left of the highest order sector 20, whereas the projection 209 is located one step to the right of the lowest order sector 20. The projections 208 and 209 are adapted to cooperate with the plate 211, and the fingers of lever 198 respectively.

At rest the sector 212 locates the plate 211 disengaged counterclockwise with respect to the rest or zero position of the projection 207 as shown in FIG. 1. Furthermore, the plate 211 (FIG. 3) is located just to the left of the highest order sector 20 with the edge 214 vertically distanced from the edge 205 of the projection 207, whereas the lever 198 locates the fingers 201 and 202 in correspondence with the next lower order sector 20. When the support 126 is displaced one step leftwards as above described, the plate 211 is brought just at left of the projeciton 208, whereas the lugs 201 and 202 are brought in correspondence with the highest order sector 20.

If a figure from "zero" to "four" is set up on a sector 20, the finger 201 (FIG. 1) is located above the edge 204 and the finger 202 above the edge 205. On the contrary, if a figure from "five" to "nine" is set up on a sector 20 the finger 201 is located above the edge 205 and the finger 202 above the edge 206. When the lever 119 (FIG. 3) is rocked counterclockwise by the lever 111, the slide 167 (FIG. 4) is depressed and consequently the lever 169 is rocked clockwise around the pin 171 and locates the shoulder 173 temporarily to the position shown by broken lines in the FIG. 4 When the program shaft 42 is displaced to the station VII, the cam 148 causes the lever 149 to rock clockwise, thus displacing the link 151 and the slide 167 forwards. The cam slot 168 causes now the slide 167 to be raised and consequently the lever 169 is rocked counterclockwise thus restoring substantially the relative position of the shoulder 173 with respect to the stop 174. Furthermore, the link 151 rocks the lever 152 counterclockwise, thus locating the shoulder 157 of the lever 154 into the path of the lug 159 of the lever 162.

Figure 5:
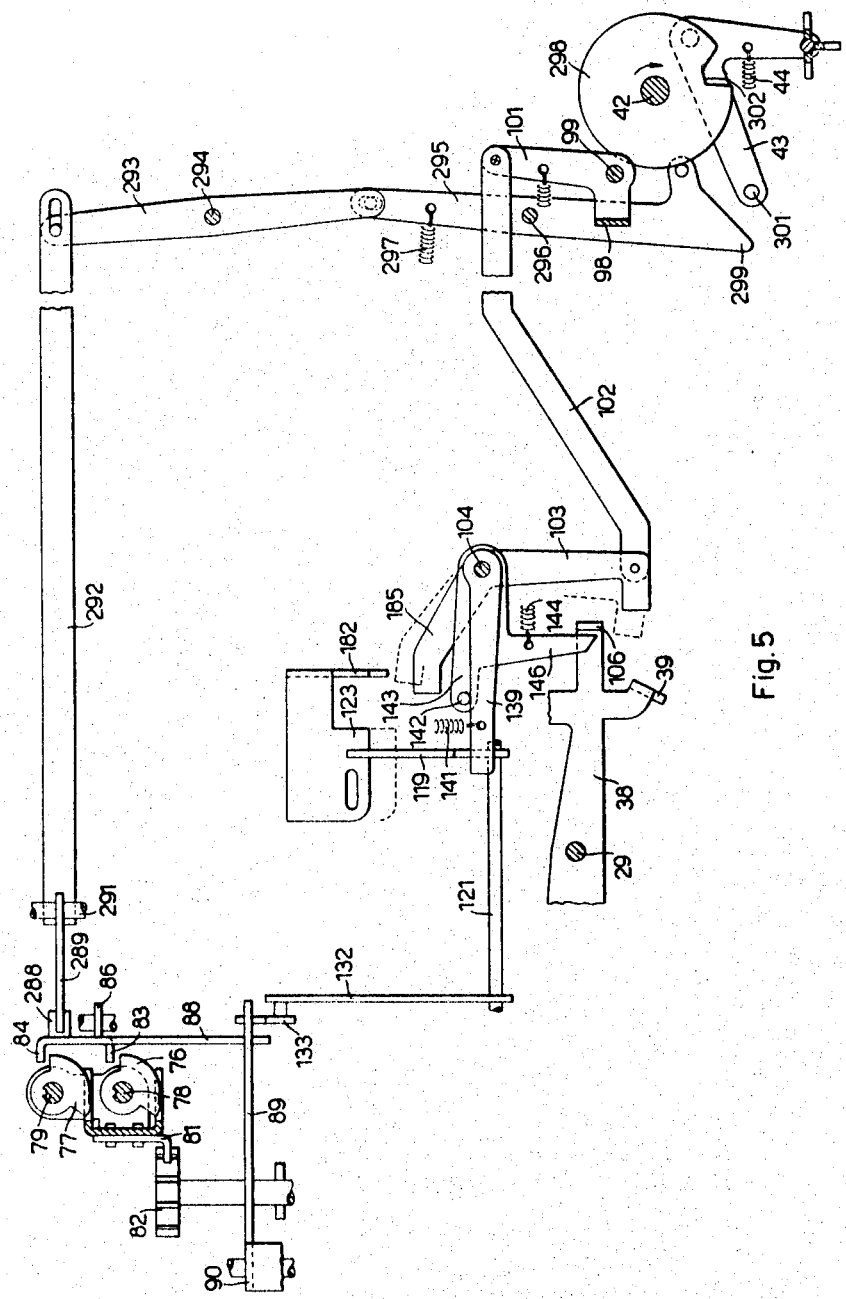
FIG. 5 is another left hand partial sectional view of the machine.

In the station VII of the program, the cam 96 causes the bail 98 (FIG. 4) to rock clockwise to an intermediate position, wherein the link 102 (FIG. 5) holds still the latch 103 into the path of the lug 106 of the lever 38 as shown by broken lines in the FIG. 5. In turn the lever 111 (FIG. 4) is displaced forwards so as to disengage the project 118 from the lever 119 which now is held rocked counterclockwise by the latch 136 (FIG. 3). Therefore the lever 139 (FIG. 5) remains in the rocked position and the projection 146 (FIG. 5) of the lever 143 contacts still the lug 106 of the lever 38. Finally, the projection 116 (FIG. 4) of the lever 111 releases the lug 117 of the lever 31, while the lever 28 is automatically rocked counterclockwise to operate the lever 33 thus starting a new machine cycle.

Under the control of the program shaft 42 the shaft 23 causes now the rack 47 (FIG. 1) of the carriage 12 to mesh with the pinion 52, whereby the multiplicand may be shifted rightwards, while the rack 63 of the carriage 17 remaining in mesh with the pinion 52 will cause the multiplier to be shifted leftwards. It is thus clear that during the multiplication the two memories 12 and 17 are connected by motion inverting means comprising the pinion 52 so as to shift the multiplicand memory step by step rightwards and the multipler memory step by step leftwards.

Furthermore, the carriage 12 is selected for engaging the actuators 10 and the latch 61 is prevented from disengaging the gears 58 during the second part of the auxiliary cycle. Finally, the cam 34 (FIG. 4) of the shaft 23, rocks the lever 35 counterclockwise thus displacing the link 154 rearwards. Then the shoulder 157 engages the lug 159 and rocks the lever 162 clockwise, thus lowering the support 126, which is now locked in the reached position by the locking member 164. The plate 211 is now ready for engaging the projection 208 and the lever 198 is ready for sensing the upper edge 205 of the highest order sector 20. The bent lug 123 (FIG. 3) of the support 126 is now released from the latch 136, which will now contact the stop 138, whereby the spring 129 urges the support 126 to return rightwards.

In the case a multiplier digit from "zero" to "four" is set up on the highest order sector 20 the projection 207 does not affect the lever 198 and the plate 211 remains out of the path of the projection 208 of the bail 15. The support 126 returns rightwards till contacting the projection 127 of the machine frame. Thus the support 126 rocks the levers 119 and 132 clockwise and the slide 133 disengages the arm 89 of the bail 90 (FIG. 2). Then the shaft 23 causes the clutch of the shaft 56 to be engaged, whereby the carriage 17 is shifted leftwards and the carriage 12 is returned rightwards. The carriage 17 upon being shifted leftwards one step causes the projection 207 of the highest order sector 20 (FIG. 3) to contact the plate 211 of the sector 212, thus displacing the support 126 again leftwards and rocking the levers 119 and 132 counterclockwise. Now the slide 133 rocks the bail 90 (FIG. 2) clockwise and disengages the clutch of the shaft 56.

If in the case a multiplier digit from "five" to "nine" is set up on the highest order 20 of the carriage 17, upon lowering the support 126, the finger 201 encounters the edge 205 of the projection 207 (FIG. 1) whereby the lever 198 is rocked clockwise. Since the locking member 191 locks yieldably the wheel 189, the shaft 188 and the pinion 192, the finger 201, through the arm 197, the rod 194 and the pinion 193 displaces the sector 212 one step toward the higher figures, that is clockwise. Thus the plate 211 is located into the path of the projection 208 of the bail 15. Now the support 126 cannot return fully rightwards, whereby the clutch of the shaft 56 is held disengaged and consequently the carriages 12 and 17 are not shifted.

In both the above cases the tapered edge 183 (FIG. 3) of the lug 182 of the support 126 (FIG. 3) engages the arm 185 and rocks the latch 103 (FIG. 5) counterclockwise, whereby the lug 106 of the lever 38 will no more be arrested thereby.

At the end of the first part of the following auxiliary cycle the lever 38 (FIG. 5) may be now rocked clockwise thus arresting the auxiliary shaft 24 bodily with the sleeve 37, and causing the main shaft 25 to be cycled. The lever 143 is now rocked counterclockwise by the spring 144 and its projection 146 is located above the lug 106, whereby the lever 38 is held locked clockwise and the main shaft 25 is repeatedly cycled, until the lever 119 (FIG. 3) is held counterclockwise rocked by the support 126. Thereafter the second part of the auxiliary cycle is effected. Therefore each order of the multiplier requires a cycle of the servomotor shaft 23, a cycle of the auxiliary shaft 24 bodily with the sleeve 37 and a variable number of repeated cycles of the main shaft 25.

Add-subtract control device

Secured to the rod 194 (FIG. 3) is a flange 215. Slidably and rotatably mounted on the rod 194 (FIG. 3) between flange 215 and the lever 198 is a link 216 also linked with a lever 217 fulcrumed on a stationary pivot 218. The lever 217 is provided with a pin 219 (FIG. 1) cooperating with a spring urged locking member 221. Furthermore, the lever 217 is provided with a pin 222 engaging a slot 223 of a first vertical slide 224, and with another pin 226 engaging a slot 227 of a second vertical slide 228. Both the slides 224 and 228 are fulcrumed on a pivot 229 secured to a lever 231 in turn fulcrumed on a stationary pivot 232 and cooperating with a pair of complementary cams 233 (FIG. 1) of the sleeve 37. Linked with the lever 231 is also a latch 234 normally urged by a spring 235 to engage a disk 236 (FIG. 3) provided with four teeth distanced 90 degrees and secured to a shaft 237 rotatably mounted on the machine frame.

Secured to the shaft 237 is another disk 238 provided with two opposite teeth adapted to cooperate with a shoulder 239 of the vertical slide 224. A third disk 241 also secured to the shaft 237 is provided with two opposite teeth adapted to cooperate with a shoulder 242 of the vertical slide 228. The teeth of the disk 241 are angularly displaced 90 degrees with respect to those of the disk 238, and 45 degrees with respect to those of the disk 236. Secured to the shaft 237 is also a pinion 243 having twelve teeth and cooperating with a spring urged locking member 244.

Finally, secured to the shaft 237 is a two lobed cam 246 (FIG. 6) normally contacted by a pin 247 of a lever 248 fulcrumed on a stationary shaft 249. Linked to the lever 248 is a pawl 251 adapted to cooperate with two shoulders 252 and 253 of an add-subtract control member formed on a slide 254 adapted to assume three longitudinally different positions. The slide 254 is provided with a slot 255 engaging a pin 250 of an arm 256 adapted to condition in a known manner the totalizer for addition when the slide 254 is located at each one of the two extreme positions and for subtraction when the slide 254 is located in the central position.

Normally as shown in the FIGS. 1 and 3, the lever 217 holds the slide 228 in a forward ineffective position with respect to the disk 241, and the slide 224 in a rearward effective position for engaging the disk 238. Since this latter is normally located in an angular position wherein its teeth are substantially in a vertical plane out of the path of the shoulder 239, the lever 231 cannot be rotated by the shoulder 239.

During each cycle of the shaft 23 corresponding to each order of the multiplier, the support 126 is lowered as described hereinabove for the highest order. Then the lever 198 senses the sector 20 of the next lower order. In the case a figure less than five is set up on the sensed sector 20, the multiplication is to be effected by repeated additions according to the direct method. The projection 207 is sensed by the finger 202, whereby the lever 198 remains in the position of FIG. 1 without affecting the lever 217. The shaft 237 and the slide 254 remain in the addition position of FIGS. 1 and 6.

In the case a figure equal to or higher than "five" is set up on the sector 20 the multiplication is to be effected by repeated subtractions according to the short-cut method. The projection 207 (FIG. 1) is now sensed by the finger 201, whereby the lever 198 is rocked clockwise and consequently the arm 197 (FIG. 3) thereof and the rod 194 displace the link 216 forwards. The lever 217 is then rocked clockwise and displaces the slide 228 rearwards to bring the shoulder 242 (FIG. 3) into an effective position for engaging one of the two teeth of the disk 241, whereas the slide 224 is displaced forwards in an ineffective position with respect to the disk 238.

In the first part of the following auxiliary cycle, when the cams 233 (FIG. 1) of the sleeve 37 rock the lever 231 clockwise and raise the slides 224 and 228, the shoulder 242 (FIG. 3) of the slide 228 encounters now one of the two teeth of the disk 241. Thus the disk 241 is rotated counterclockwise one step of the pinion 243, namely 30 degrees, bodily with the shaft 237, the disk 238, 236 and the cam 246. The lever 231 raises also the latch 234 which engages now the subsequent tooth of the disk 236. Furthermore upon being rotated 30 degrees, the cam 246 (FIG. 6) rocks the lever 248 clockwise, so as to cause the pawl 251 to contact the shoulder 252 of the slide 254.

At the end of the counting cycles of the main shaft 25 the shaft 24 and the sleeve 37 effect the second part of the auxiliary cycle, whereby the cams 233 (FIG. 1) rock the lever 231 counterclockwise, thus depressing the slides 224, 228 and the latch 234 (FIG. 3). This latter rotates now the disk 236 together with the shaft 237 and the disks 238 and 241 further 60 degrees counterclockwise. Therefore the shaft 237 is rotated 90 degrees for each multiplier order wherein the lever 198 is rocked.

The cam 246 (FIG. 6) of the shaft 237 through the lever 248 causes the pawl 251 to displace the slide 254 rearwards, so that the totalizer is predisposed to be reversed for repeated subtraction cycles. The totalizer will be reversed to its subtracting condition during the servomotor cycle preceding the main shaft counting cycles relating to the multiplier order sensed by the lever 198.

If a figure higher than "four" is also set up on the next lower order sector 20 (FIG. 3) the projection 207 now sensed by the lever 198, causes the lever 217 to remain in the clockwise position, whereby the disk 241 presents no tooth into the path of the slide 228 and the slide 224 is located forwards with respect to the tooth of the disk 238. Now the lever 231 when operated doesn't affect the shaft 237 and therefore the totalizer remains still in the subtracting condition.

Figure 6:
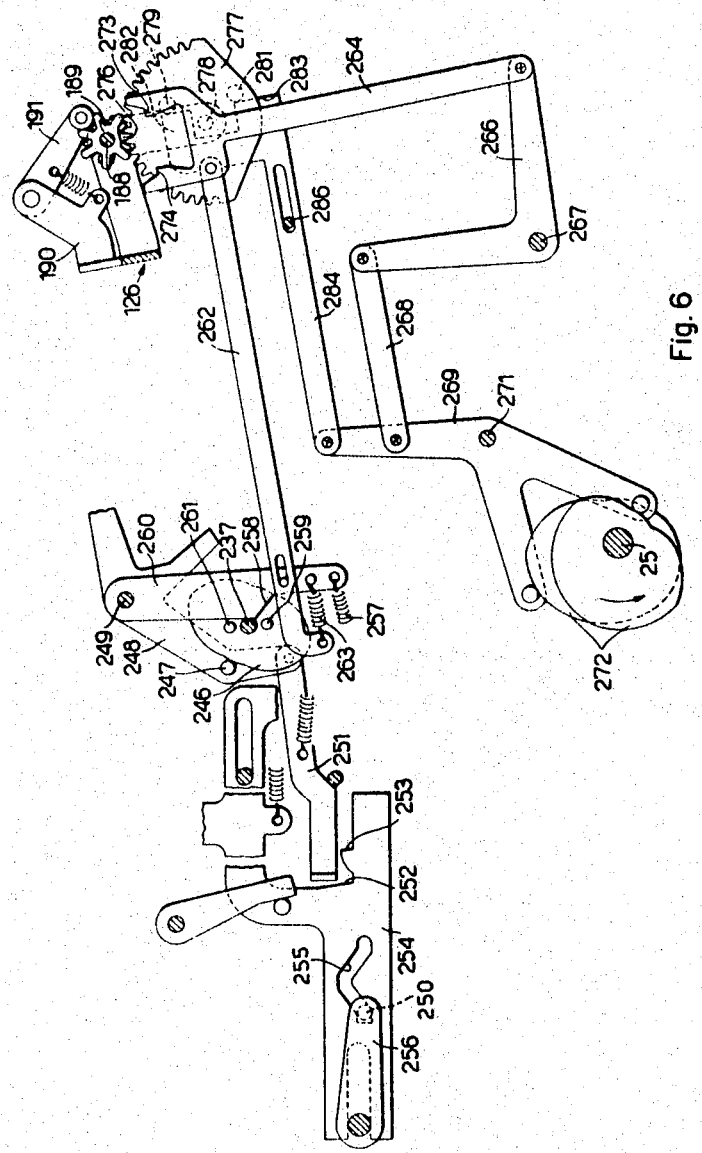
FIG. 6 is a partial sectional view taken according to the line VI—VI of FIG. 2.

If a figure equal to or lower than "four" is set up on the next lower order sector 20, the lever 198 upon sensing the projection 207 is returned to the position of FIG. 1, whereby the slide 244 is now brought with the shoulder 239 under the tooth of the disk 238. During the first part of the auxiliary cycle, when the lever 231 is rocked counterclockwise, the slide 224 (FIG. 3) causes the disk 238 to rotate 30 degrees counterclockwise, bodily with the shaft 237 and the cam 246 (FIG. 6). At the end of the counting cycles, during the second part of the auxiliary cycle, the lever 231 (FIG. 3) is restored clockwise thus causing the latch 234 to further rotate the shaft 237 60 degrees. The cam 246 (FIG. 6) now causes the lever 248 to be restored in the position of FIG. 6, whereby the pawl 251 causes the slide 254 to return forwards into the adding position of FIG. 1.

The calculating machine is also adapted to effect the negative multiplication, to accumulate subtractively the product into the totalizer. To this purpose, upon setting up the multiplier, the multiplication is started by depressing subtraction key not shown on the drawings, instead of the addition key. Then the subtraction key displaces the slide 254 to the central position, whereby the multiplier figures from "zero" to "four" are calculated subtractively. When a sector 20 storing a figure from "five" to "nine" is sensed, the pawl 251 upon being displaced rearwards, engages the shoulder 253 and displaces the slide 254 to the extreme rearward position, thus predisposing the totalizer for being reversed to the adding condition.

Cycle-counting device

Fulcrumed on the shaft 249 is also a lever 260 (FIG. 6) normally urged by a spring 257 to contact the shaft 237. The lever 260 is provided with a shoulder 258 adapted to be engaged by each one of two diametrically opposite pins 259 and 261 secured to the cam 246. The lever 260 is pin and slot connected with a link 262 also connected thereto by a spring 263. Furthermore, the link 262 is linked on a slide 264 in turn pivoted on a lever 266. This latter is fulcrumed on a stationary pivot 267 and connected through a link 268 to a lever 269. The lever 269 is fulcrumed on a stationary pivot 271 and cooperates with two complementary cams 272 secured to the main shaft 25.

The slide 264 (FIG. 3) is provided with a pair of selectable pawls 273, 274 for alternately engaging the toothed wheel 189. Furthermore, secured to the shaft 188 is a pinion 276 meshing with a toothed sector 277 rotatably mounted on a pivot 278 but not slidably thereon. The pivot 278 is secured to the right flank 187 of the support 126. Secured to the sector 277 are a pair of pins 279 and 281 adapted to cooperate with a pair of restoring members formed by projections 282 and 283 of a link 284 slidably mounted on a stationary pin 286 (FIG. 6) and linked with the lever 269. Normally the wheel 189 (FIG. 3) is located at right of the slide 264, whereas the pins 279 and 281 are located in front of the projections 282 and 283.

As hereinabove described, after the support 126 has been lowered, if a multiplier figure from "zero" to "four" is processed, the projection 207 of the sector 20 by engaging the plate 211 displaces the support 126 leftwards. The wheel 189 is thus brought on the plane of the slide 264 and the pins 279 and 281 of the sector 277 are brought at left of the link 284. Assuming at first that the lever 198 senses a sector 20 storing a multiplier figure from "zero" to "four" and that a figure from "zero" to "four" is stored on the sector 20 engaged by the plate 211, the lever 198 does not cause the shaft 237 to be rotated. Consequently the lever 260, the link 262 and the slide 264 remain in the position of the FIG. 6.

At each counting cycle of the main shaft 25 the cams 272 rock the lever 269 first counterclockwise and then clockwise. Then the lever 269 on one hand displaces the link 284 rearwards, on the other hand through the link 268 and the lever 266 it raises the slide 264, the pawl 273 (FIG. 3) of which engages the wheel 189. This latter is now rotated one step counterclockwise together with the shaft 188 and the pinion 192 which through the pinion 193 displaces the sector 212 and the plate 211 one step counterclockwise, whereas the pinion 276 rotates he sector 277 clockwise. Subsequently the lever 269 (FIG. 6) restores the slide 264 downwards and the link 284 (FIG. 3) forwards without affecting the sector 277 since the support 126 is displaced leftwards. The sector 212 is thus displaced step by step counterclockwise, and causes the plate 211 to slide along the projection 207 of the sector 20.

When the slide 212 has been displaced counterclockwise a number of steps corresponding to the figure set up on the sector 20, the plate 211 leaves the projection 207. Now the spring 129 returns the support 126 rightwards, whereby the sector 277 brings the pins 279 and 281 on the plane of the link 284. At the end of the last counting cycle of the main shaft 25, the lever 269 (FIG 6) displaces again the link 284 (FIG. 3) forwards. The projection 283 of the link engages now the pin 281, thus returning the sector 277 together with the wheel 189, the pinions 192, 193 and the sector 212 to the position of FIG. 3.

If a figure from "five" to "nine" is stored on the sector 20 engaged by the plate 211, the shaft 237 has been rotated 90 degrees under the control of the lever 198. In this case the pin 259 (FIG. 6) of the cam 246 has rocked the lever 256 counterclockwise, thus displacing the link 262 forwards. The slide 264 has been rocked clockwise and the pawl 274 thereof (FIG. 3) has been selected to engage the wheel 189.

At each counting cycle the lever 269 causes the pawl 274 to rotate the wheel 189 step by step clockwise, whereby on one hand the sector 277 is rotated counterclockwise, on the other hand the sector 212 is displaced step by step clockwise by the pinions 192 and 193, while the plate 211 slides along the projection 207. When the sector 212 has displaced clockwise a number of steps corresponding to the complement to ten of the digit set up on the engaged sector 20, the plate 211 leaves the projection 207. The support 126 return then righwards, whereby when the lever 269 (FIG. 6) moves again the link 284 forwards, the projection 282 (FIG. 3) engages the pin 279 and restores the shaft 188 together with the sector 212.

It is thus evident that the control member 212 for the cyclically operating mechanism 25 is adapted to engage sequentially each member 20, the mechanism 25 being adapted to displace the control member 212 step by step along the engaged member in a predetermined direction in the case the engaged member 20 is set up according to a figure requiring the direct method of multiplication and in a direction opposite to said predetermined direction in the case said engaged member 20 is set up according to a figure requiring the short cut method.

Assuming now that the lever 198 senses a sector 20 storing a multiplier digit from "five" to "nine," the lever 198 is rocked clockwise and previously displaces the sector 212 one step clockwise, namely towards the higher figures. Consequently if during the counting cycles of the main shaft 25 the sector 212 is displaced counterclockwise for a multiplier figure from "zero" to "four," it must effect a step more than the preceding case to leave the projection 207 of the sector 20. Therefore the main shaft 25 effects one counting cycle more. On the other hand, if the sector 212 is displaced clockwise for a multiplier figure from "five" to "nine" it effects a step less than the preceding case to leave the projection 207 of the sector 20, and the main shaft 25 effects one counting cycle less. In this manner the multiplier order next higher than a multiplier order requiring the short-cut method is corrected by adding one unit thereto.

As hereinabove described, in the case a figure higher than four is set up on the highest order sector 20, the plate 211 (FIG. 3) is engaged by the projection 208 of the bail 15. Therefore, the carriage 17 cannot be shifted leftwards before the main shaft 25 effects a counting cycle to cause the plate 211 to release the projection 208, whereby the first series of subtraction cycles is preceded by an adding cycle in the higher order of the totalizer. In the case the multiplier fills all the capacity of the carriage 17, when the lower order sector 20 is engaged by the plate 211, at the starting of the counting cycle the lever 198 must be always returned at rest. For this purpose the bent lug 202 of the lever 198 senses the projection 209 of the carriage 17, which is distanced one step from the lowest order sector 20, whereby the lever 198 returns to the position of FIG. 1, in the case it is not already in said position.

Multiplicand and multiplier shifting

At each cycle of the main shaft 25 the cam 181 (FIG. 4) rocks the lever 177 clockwise. As hereinabove described, the lever 169 is normally locked by the stop 174, whereby when the lever 177 is rocked it tensions the springs 176, without affecting the levers 169 and 33. At the end of the counting cycles relating to a predetermined muliplier order, the plate 211 (FIGS. 3) leaves the projection 207 after a predetermined counterclockwise or a clockwise stroke therealong. Then the spring 129 returns the support 126 rightwards, whereby the lug 123 rocks the lever 119 clockwise. Then the lever 119 causes the lever 139 (FIG. 5) to be restored clockwise by the spring 141, whereby the lever 143 releases the lever 38. Thereafter the main shaft 25 is arrested and causes the shaft 24 and the sleeve 37 to effect the second part of the auxiliary cycle.

Simultaneously the lever 119 through the slide 167 (FIG. 4) displaces the lever 169 upwards, thus disengaging the shoulder 173 from the stop 174. Thereafter, when the cam 181 of the shaft 25 rocks the lever 177 clockwise, the spring 176 displaces the lever 169 forwards thus rocking the lever 33. A new cycle of the servomotor shaft 23 is now started simultaneously with the second part of the auxiliary cycle, whereby the speed of the machine is increased.

During this cycle of the shaft 23, the clutch of the shaft 56 (FIG. 2) is engaged, whereby the carriage 17 is shifted leftwards, while the carriage 12 is shifted rightwards, till the projection 207 of one of the lower order sectors 20 encounters the plate 211 of the sector 212, thus displacing again the support 126 leftwards. Consequently, through the levers 119, 132, the bail 90 (FIG. 2) is rocked and arrests the shaft 56 and therefore the carriages 12 and 17.

Therefore, if a figure from "one" to "eight" is stored into the next lower order sector 20, the carriages 12 and 17 are shifted one step only in opposite directions. If the figure "zero" is stored into such a sector 20 and a figure higher than four is stored into the next following sector 20, or if the figure "nine" is stored into such a sector 20 and a digit less than five is stored in the next following sector 20, the lever 198 (FIG. 3) predisposes the plate 211 to arrest such a sector 20 after displacing the carriages 12 and 17 one step.

However, if the figure "zero" is stored into such a sector 20 and a figure less than five is stored into the next following sector 20 or if a digit "nine" is stored into such a sector 20 and a figure higher than four is stored into the following sector 20, such a sector 20 doesn't encounter the plate 211, the shaft 56 is not arrested and consequently the relative multiplier order requires no counting cycle and no stopping of the carriages 12 and 17. It is so evident that the multiplication has no counting cycle for a series of "zero" or a series of "nine" of the multiplier. In the case of a series of nine there is only a cycle of the main shaft 25 on the order at left of the highest order nine.

After the support 126 is returned leftwards, the shaft 23 starts a cycle of the auxiliary shaft 24 and thereafter a series of the main shaft 25 will follow according to the figure stored into the sector 20 arrested by the plate 211, in a manner similar to that above described.

Multiplication stopping device

The slide 86 (FIG. 2) is provided with a projection 288 engaging a forked end of a lever 289 fulcrumed on a stationary pivot 291. The level 289 is connected to a link 292 (FIG. 5), the forward end of which is pin and slot connected with a lever 293 fulcrumed on a stationary pivot 294. In turn the lever 293 is pin and slot connected with another lever 295 fulcrumed on another stationary pivot 296. The lever 295 is urged by a spring 297, prevailing over the spring 44 of the lever 43, to contact a cam 298 of the program shaft 42. The lever 295 is also provided with a projection 299 adapted to cooperate with a pin 301 of the lever 43. The cam 298 is provided with a notch 302 corresponding to the station VII, whereby during the multiplication cycles, wherein the program shaft is located into the station VII, the lever 295 is rocked counterclockwise and the projection 299 engages the pin 301, thus returning the lever 43 clockwise to the position of FIG. 5, whereby the program shaft cannot be displaced in the following stations.

As stated hereinabove, the sector 77 engages the toothed edge of the slide 81 and its position on said rack represents the record of the number of orders of the multiplier set up on the carriage 17 (FIG. 1). During the cycle of the servomotor shaft 23 relating to the lowest order of the multiplier, the carriage 17 reaches the same position reached at the end of the multiplier set up. Then the sector 77 (FIG. 5) encounters the lug 84 of the slide 86 and this latter through the projection 88 rocks the arm 89 of the bail 90 (FIG. 2) clockwise thus disengaging the clutch of the shaft 56. Therefore, the carriages 12 and 17 are arrested also in the case one or more orders of the multiplier are represented by zeros, and no projection 207 (FIG. 3) encounters the plate 211 of the sector 212.

The slide 86 (FIG. 2), upon being displaced leftwards, rocks the lever 289 counterclockwise, thus displacing the link 292 (FIG. 5) rearwards. The lever 293 is thus rocked counterclockwise, and rocks the lever 295 clockwise, whereby the projection 299 releases the pin 301 of the lever 43. Now the spring 44 rocks the lever 43 clockwise, whereby in the first part of the following auxiliary cycle the program shaft 42 is rotated to the next following station predetermined for the multiplication, namely the station XII.

The cam 148 (FIG. 4) which in the station VII caused the lever 149 to be rocked clockwise, when the program shaft 42 is displaced to the station XII returns the lever 149 counterclockwise, thus returning the link 151 rearwards. This latter through the lever 152 returns the link 154 upwards predisposing the shoulder 158 in front of the lug 161 of the lever 162. Furthermore, the link 151 returns the slide 167 rearwards, whereby the cam slot 168 causes the lever 169 to be depressed. The lever 169 is thus returned definitively in front of the stop 174, whereby the following cycle of the shaft 23 cannot be started by the cam 181.

If the lowest order of the multiplier is different than zero, the projection 207 (FIG. 3) of the corresponding sector 20 through the plate 211 displaces the support 126 leftwards whereby the lug 106 of the lever 38 (FIG. 5) is not locked by the latch 103. The lever 38 may be rocked and the counting cycles of the main shaft 25 are effected as in the foregoing case. At the end of these counting cycles, the second part of the auxiliary cycle is effected and the program shaft 42 causes a non-calculating key to be automatically depressed to initiate a new machine cycle. On the contrary, if the lowest order of the multiplier is zero, the support 126 remains at right, the lug 182 (FIG. 3) does not engage the arm 185 and the latch 103 (FIG. 5) remains into the path of the lug 106 of the lever 38. The main shaft 25 does not effect any cycle and the second part of the auxiliary cycle is started immediately after the first part of the auxiliary cycle to automatically depress the non-calculating key.

Now the depressed non-calculating key causes a servomotor cycle wherein under the control of the program shaft the rack 47 (FIG. 1) of the carriage 12 engages the arm 53 of the bail 54. Furthermore, the cam 34 (FIG. 4) of the shaft 23, through the lever 35 and the link 154, restores the lever 162 counterclockwise, thus restoring the support 126 to the upward position. Thereafter, in the first part of the auxiliary cycle the program shaft 42 is displaced to the station XIV. Now the main shaft 25 effects a printing cycle, wherein the multiplier is printed. In the second part of the auxiliary cycle, latch 61 (FIG. 1) and the bail 54 are disengaged, whereby the two carriages 12 and 17 and the slide 81 are restored rightwards. Finally, the total key is automatically depressed by a program cam and thus another machine cycle is started. In the first part of the subsequent auxiliary cycle the program shaft returns to the station I, whereas the main shaft 25 effects a total taking cycle, thus printing the total, which is also transferred back to the carriage 12, in the manner described in the United States patent application Ser. No. 405,368, dated Oct. 21, 1964, now patent No. 3,260,449.

It is intended that modifications, improvements and additions of parts may be made to the described multiplication device without departing from the scope of the invention as defined in the appended claims.

What I claim is:

1. An automatic short-cut multiplication device for a calculating machine having a cyclically operating mechanism, a memory adapted to store a multiorder multiplier and provided in each order with a set up member differentially settable according to the corresponding figure of said multiplier and comprising in combination:
    (a) an element secured to each one of said set up members,
    (b) a control member for said mechanism adapted to sequentially engage the element of each one of said set up members and to be displaced step by step from a starting position in a pair of opposite directions along the engaged element without affecting said set up members,
    (c) and means operated by said mechanism for displacing said control member step by step in a first one of said pair of directions in the case the set up member carrying the engaged element is set up according to a figure requiring the direct method of multiplication, and in the other direction in the case the set up member carrying the engaged element is set up according to a figure requiring the shortcut method, said element being so shaped as to cause said control member to be displaced a number of steps equal to the multiplier figure when moved in said first direction and equal to the complement to ten of said multiplied figure when moved in said other direction.

2. An automatic shortcut multiplication device for a calculating machine, having a cyclically operating mechanism, a memory adapted to store a multiorder multiplier and provided in each order with a set up member differentially settable according to the corresponding figure of said multiplier, and comprising in combination:
    (a) a contol member for said mechanism adapted to be displaced step by step from a starting position in a pair of opposite directions,
    (b) an element secured to each one of said set up members and having a predetermined length,
    (c) a counter element secured to said control member and having a length equal to the complement to nine of said step with reference to said predetermined length, said counter element being adapted to sequentially engage each one of said up members,
    (d) and means operated by said mechanism for displacing said counter element in one of said pair of directions in the case the engaged set up member is set up according to a figure requiring the direct method for multiplication, and in the other direction of said pair in the case said engaged set up member is set up according to a figure requiring the shortcut method, said counter element being then displaced along said engaged element and being adapted to disable said operable means when it leaves said engaged element.

3. An automatic shortcut multiplication device for a calculating machine, having a cyclically operating mechanism, a memory adapted to store a multiorder multiplier and provided in each order with a set up member differentially settable according to the corresponding figure of said multiplier, and comprising in combination:
    (a) a control member for said mechanism adapted to be displaced step by step from a starting position in a pair of opposite directions,
    (b) an element secured to each one of said set up members and having a predetermined length,
    (c) a counter element secured to said control member and having a length equal to the complement to nine of said step with reference to said predetermined length, said counter element being adapted to sequentially engage each one of said set up member by laterally contacting same,
    (d) means operated by said mechanism for displacing said counter element in one of said pair of directions in the case the engaged set up member is set up according to a figure requiring the direct method of multiplication, and in the other direction of said pair in the case said engaged set up member is set up according to a figure requiring the shortcut method, said counter element being then displaced along said engaged element and being adapted to disable said operable means when it leaves said engaged element,
    (e) means for restoring said control member to said starting position when said counter element leaves one of said elements,
    (f) and shifting means for relatively shifting said memory and said control member until said counter element contacts the element of the next following set up member storing a significant figure.

4. An automatic shortcut multiplication device for a calculating machine, having a cyclically operating mechanism, a memory adapted to store a multiorder multiplier and provided in each order with a set up member differentially settable according to the corresponding figure of said multiplier, and comprising in combination:
    (a) a control member for said mechanism adapted to be displaced step by step from a starting position in a pair of opposite directions,
    (b) an element secured to each one of said set up members and having a predetermined length,
    (c) a counter element secured to said control member and having a length equal to the complement to nine of said step with reference to said predetermined length, said counter element being adapted to sequentially engage each one of said set up members,
    (d) means operated by said mechanism for displacing said counter element in one of said pair of directions in the case the engaged set up member is set up according to a figure requiring the direct method of multiplication, and in the other direction of said pair in the case said engaged set up member is set up according to a figure requiring the shortcut method, said counter element being then displaced along said engaged element and being adapted to disable said operable means when it leaves same.
    (e) a sensing member comprising a pair of fingers distanced according to said predetermined length and adapted to alternately engage the element of the set up member of the next lower order with respect to said engaged set up member,
    (f) and means controlled by said sensing member for displacing said counter element one step toward the higher figures when a figure requiring the shortcut method is set up in said sensed set up member.

5. An automatic shortcut multiplication device for a calculating machine, having a cyclically operating mechanism, a memory adapted to store a multiorder multiplier and provided in each order with a set up member differentially settable according to the corresponding figure of said multiplier, and comprising in combination:
    (a) a control member for said mechanism adapted to be displaced step by step from a starting position in a pair of opposite directions,
    (b) an element secured to each one of said set up members and having a predetermined length, (c) a counter element secured to said control member and having a length equal to the complement to nine of said step with reference to said predetermined length, said counter element being adapted to sequentially engage each one of said set up members by laterally contacting same, (d) means operated by said mechanism for displacing said counter element in one of said pair of directions in the case the engaged set up member is set up according to a figure requiring the direct method of multiplication, and in the other direction of said pair in the case said engaged set up member is set up according to a figure requiring the shortcut method, said counter element being displaced along said engaged element and being adapted to disable said operable means when it leaves same, (e) means for restoring said control member to said starting position when said counter element leaves one of said elements, (f) shifting means for relatively shifting said memory and said control member till said counter element contacts the element of the next lower set up member storing a significant figure, (g) a sensing member comprising a pair of fingers distanced according to said predetermined length and adapted to alternately engage the element of the set up member of the next lower order with respect to said engaged set up member, (h) means controlled by said sensing member for displacing said counter element one step toward the higher figures when a figure requiring the shortcut method is set up in said sensed set up member, (i) and in add-substract conditioning member adapted to be controlled by said sensing member according to the figure of said sensed set up member.

6. A device according to claim 5, comprising in combination:

(j) another element comprised in said memory and located at the left of the highest order set up member, said other element being engageable by said counter element when said sensing member senses in said highest order set up member a figure requiring the shortcut method.

7. A device according to claim 5, comprising in combination:

(j) a toothed member connected to said control member, (k) a pair of selectable pawls operable by said mechanism for engaging said toothed member to displace said control member in a corresponding one of said directions, (l) and means controlled by said sensing member for selecting said pawls according to the figure of said sensed set up member.

8. A device according to claim 5, comprising in combination:

(j) a support for mounting said control member and said sensing member, (k) and means operable by said mechanism for moving said support in a first direction to cause said control member and said sensing member to cooperate with said set up members, said support when so moved being transversely reciprocable between a pair of positions upon engagement and disengagement of said counter element by one of said elements to control said shifting means.

9. A device according to claim 5, comprising in combination:

(j) a pair of diametrally opposite elements connected to said control member, (k) said restoring means comprising a pair of restoring members for selectively engaging said opposite elements, (l) and means controlled by said sensing member for selecting said restoring members according to the figure of said sensed set up member.

10. A device according to claim 5, comprising in combination:

(j) a toothed member connected to said control member, (k) a pair of normally ineffective pawls operable by said mechanism and selectable for engaging said toothed member to displace said control member in a corresponding one of said directions, (l) a pair of diametrally opposite elements connected to said control member, (m) said restoring means comprising a pair of normally effective restoring members for selectively engaging said opposite elements, (n) means controlled by said sensing member for selecting said pawls and said restoring members according to the figure of said sensed set up member, (o) a support for mounting said sensing member and said control member with said toothed member and said opposite elements, (p) and means operable by said mechanism for moving said support in a first direction to cause said control member and said sensing member to cooperate with said set up members, said support when so moved being displaced in a second direction upon engagement of said counter element by one of said elements, said support when so displaced being adapted to render said pawls effective and to disable said restoring members.

11. A device according to claim 5, comprising in combination:

(j) a toothed member connected to said control member, (k) a pair of normally ineffective pawls operable by said mechanism and selectable for engaging said toothed member to displace said control member in a corresponding one of said directions, (l) a pair of diametrally opposite elements connected to said control member, (m) said restoring means comprising a pair of normally effective restoring members for selectively engaging said opposite elements, (n) a pair of advancing elements selectable by said sensing member and reciprocable by said mechanism, (o) a pair of bodily rotatable disks associated with said advancing elements and provided with teeth located at alternate angular positions, each advancing element upon being selected being adapted to engage the teeth of the associated disks only once irrespective of its reciprocations, (p) and cam means bodily rotatable with said disk for controlling said add-subtract member and for selecting said pawls and said restoring members.

12. A device according to claim 11, wherein said advancing elements are adapted to preliminary rotate said disks a fraction of a predetermined angular step, comprising in combination:

(q) further advancing means operable for further rotating said disks to complete said angular step.

13. An automatic shortcut multiplication device for a calculating machine having a cyclically operating mechanism, a first memory adapted to store a multiorder multiplier and provided in each order with a set up member differentially settable according to the corresponding figure of said multiplier, a second memory adapted to store a multiorder multiplicand, said memories being individually transversely movable and settable order by order, and comprising in combination:

(a) normally ineffective connecting means adapted to be rendered effective for mutually connecting said memories before the multiplier is set up, so as said second memory is moved leftwards according to the sum of the multiplicand and the multiplier orders, (b) an element secured to each one of said set up members,
(c) a control member for said mechanism adapted to sequentially engage the element of each one of said set up members from the highest to the lower orders and to be displaced step by step from a starting position in a pair of opposite directions along the engaged element without affecting said set up members,
(d) and means operated by said mechanism for displacing said control member step by step in a first one of said pair of directions in the case the set up member carrying the engaged element is set up according to a figure requiring the direct method of multiplication, and in the other direction in the case the set up member carrying the engaged element is set up according to a figure requiring the shortcut method, said element being so shaped as to cause said control member to be displaced a number of steps equal to the multiplier figure when moved in said first direction and equal to the complement to ten of said multiplier figure when moved in said other direction.

14. An automatic shortcut multiplication device for a calculating machine having a cyclically operating mechanism, a first memory adapted to store a multiorder multiplier and provided in each order with a set up member differentially settable according to the corresponding figure of said multiplier, a second memory adapted to store a multiorder multiplicand, said memories being individually transversely movable and settable order by order, a set of actuators adapted to cooperate with said multiplicand memory, and comprising in combination:
(a) normally ineffective connecting means adapted to be rendered effective for mutually connecting said memories when the multiplier is set up, whereby said multiplicand is moved leftwards according to the sum of the multiplicand and multiplier orders,
(b) means for transversely restoring said multiplier memory before the multiplication is effected,
(c) a control member for said mechanism, said control member being located in correspondence with the lowest order actuator of said set and being adapted to be displaced step by step from a starting position in a pair of opposite directions,
(d) an element secured to each one of said set up members and having a predetermined length,
(e) a counter element secured to said control member and having a length equal to the complement to nine of said step with reference to said predetermined length, said counter element being adapted to sequentially engage each one of said set up members by laterally contacting same,
(f) means operated by said mechanism for displacing said counter element in one of said pair of directions in the case the engaged set up member is set up according to a figure requiring the direct method of multiplication, and in the other direction of said pair in the case said engaged set up member is set up according to a figure requiring the shortcut method, said counter element being then displaced along said engaged element and being adapted to disable said operable means when it leaves said engaged element,
(g) means for restoring said control member to said starting position when said counter element leaves one of said elements,
(h) shifting means for shifting said multiplier memory with respect to said control member till said counter element is contacted by the element of the next lower set up members storing a significant figure,
(i) and motion inverting means for connecting said two memories so as to cause said shifting means to shift simultaneously said multiplicand memory step by step toward the lower orders.

References Cited

UNITED STATES PATENTS

| | | | |
|---|---|---|---|
| 3,005,585 | 10/1961 | Capellaro et al. | 235—63 |
| 3,090,554 | 5/1963 | Malavazos | 235—63 |
| 3,268,165 | 8/1966 | Gelling | 235—60 |
| 3,279,692 | 10/1966 | Mueller et al. | 235—60 |

STEPHEN J. TOMSKY, *Primary Examiner.*

U.S. Cl. X.R.

235—62, 63